United States Patent

Moberg et al.

(10) Patent No.: US 10,159,900 B2
(45) Date of Patent: Dec. 25, 2018

(54) AVATAR TELEPORT CONTROLLER

(71) Applicants: Claus Christopher Moberg, Redwood City, CA (US); Daniel L Healy, Millbrae, CA (US); Kyle Emmerich, Union City, CA (US)

(72) Inventors: Claus Christopher Moberg, Redwood City, CA (US); Daniel L Healy, Millbrae, CA (US); Kyle Emmerich, Union City, CA (US)

(73) Assignee: Roblox Corporation, San Mateo, CA (US)

( * ) Notice: Subject to any disclaimer, the term of this patent is extended or adjusted under 35 U.S.C. 154(b) by 132 days.

(21) Appl. No.: 15/461,913

(22) Filed: Mar. 17, 2017

(65) Prior Publication Data

US 2018/0264363 A1    Sep. 20, 2018

(51) Int. Cl.
*A63F 13/525*      (2014.01)
*A63F 13/56*       (2014.01)
*A63F 13/537*      (2014.01)
*A63F 13/211*      (2014.01)

(52) U.S. Cl.
CPC ............ *A63F 13/56* (2014.09); *A63F 13/211* (2014.09); *A63F 13/537* (2014.09); *A63F 2300/8082* (2013.01)

(58) Field of Classification Search
CPC ...... A63F 13/56; A63F 13/211; A63F 13/537; A63F 2300/8082

USPC .......................................................... 463/31
See application file for complete search history.

(56) References Cited

U.S. PATENT DOCUMENTS

| | | | |
|---|---|---|---|
| 6,999,239 B1* | 2/2006 | Martins | G02B 27/0172 345/7 |
| 2012/0120499 A1* | 5/2012 | Harrison | G02B 17/06 359/631 |
| 2012/0327116 A1* | 12/2012 | Liu | G09G 5/377 345/633 |
| 2016/0227190 A1* | 8/2016 | Cole | H04N 13/194 |
| 2016/0283081 A1* | 9/2016 | Johnston | G06T 19/006 |
| 2016/0300387 A1* | 10/2016 | Ziman | G06T 19/003 |

* cited by examiner

*Primary Examiner* — Allen Chan
(74) *Attorney, Agent, or Firm* — Donald R. Boys; Central Coast Patent Agency, LLC

(57) ABSTRACT

A virtual reality (VR) game platform has an input mechanism, software executing on a processor from a non-transitory medium, and a display screen displaying, under control of the software, an object at a first position in a virtual environment, the object controllable by a player interacting with the VR game platform to move in the virtual environment viewed by the player from a camera centered on the object, the display screen further displaying a symmetrical region of the environment centered on the controlled object, the symmetrical region expanding in radius at a controlled rate. The player is enabled to select, using the input mechanism, a second position within the expanding symmetrical region to move the object, after which selection the object teleports to the second position, and the camera teleports to the second position as well.

18 Claims, 4 Drawing Sheets

AVATAR TELEPORT CONTROLLER

BACKGROUND OF THE INVENTION

1. Field of the Invention

The present invention is in the field of online or network-hosted video games and virtual environments, and pertains more particularly to methods and apparatus for equalizing travel time in an avatar-based game or environment navigated by both players equipped with Virtual Reality (VR) platforms, and for players not equipped with VR platforms.

2. Discussion of the State of the Art

In the field of Internet gaming and media consumption a p-layer may interact with VR content using a trackable, visual-enhancement system, such as a head-mounted-display (HMD) VR monitor. Such VR systems include those provided by Google Cardboard™, Oculus Rift™, Samsung Gear, and others. VR at the time of the present application is spreading to more and more platforms. Many existing and newly developed three-dimensional games and environments include Avatars that may represent a character a user has selected in the game or environment. In these games or environments, a client typically becomes or is associated with a particular Avatar, and a camera-control scheme is associated with the avatar, such that the avatar may be observed functioning and navigating through the environment, and a player may view in the game from the viewpoint of the avatar.

It is known to the inventor that VR functionality is now available on an increasing number of devices and platforms, and that games and environments may now be accessed by both VR equipped users and those that are not equipped with VR hardware and software. Amongst other things it is desired that all users, VR equipped and those not VR-equipped, accessing a same game session or environment that supports VR have a good experience and a relatively equal and fair playing field. In VR, users typically teleport while players not using VR platforms typically walk, run, fly, or exhibit a tracked motion that is followed by a camera. If a camera is disassociated with a VR user's head, the VR user may become disoriented and nauseous similar to a sea sickness or motion sickness experience.

The inventors know of a camera teleporting scheme, not in the public domain, that players may use in an avatar-based game to walk run or otherwise exhibit trackable movement in an environment. In this method, the player using VR may select a destination using a 3-axis controller equipped with a laser in the form of a parabolic curve or a straight laser, that they may mark a spot with and then travel to that spot using the normal travel time calculated to travel to that spot. The camera does not trail the avatar but remains stationary until the end of the path traveled and teleports just before, during, or just after the avatar is at the marked destination. The technique in this embodiment prevents the VR player from becoming disoriented with motion of a camera that is not mapped to the user's head. It has occurred to the inventors that allowing VR players to continue to teleport in an avatar-based game may also be possible without compromising the fairness of the game for all players, both VR and non-VR players.

What is clearly needed is a control scheme and method of implementation whereby VR players may teleport during game travel in a mitigated fashion so as not to gain travel advantages over players not using VR equipment during session engagement for users operating in VR mode in an Avatar-based game or environment.

BRIEF SUMMARY OF THE INVENTION

In one embodiment of the invention a virtual reality (VR) game platform is provided, comprising an input mechanism, software executing on a processor from a non-transitory medium, and a display screen displaying, under control of the software, an object at a first position in a virtual environment, the object controllable by a player interacting with the VR game platform to move in the virtual environment viewed by the player from a camera centered on the object, the display screen further displaying a symmetrical region of the environment centered on the controlled object, the symmetrical region expanding in radius at a controlled rate. The player is enabled to select, using the input mechanism, a second position within the expanding symmetrical region to move the object, after which selection the object teleports to the second position, and the camera teleports to the second position as well.

In one embodiment, the controlled rate of expansion of the symmetrical region is managed as the rate that an avatar is moveable in the virtual environment by a second player interacting with a second platform that enables the second player to traverse through the virtual environment by direct linear movement, rather than by teleporting. Also in one embodiment, the second position is selected by extending a pointer from the object in the virtual environment by use of the input mechanism, positioning an end of the pointer away from the object at a desired second position, and selecting the second position by a further input signal. Also in one embodiment, the controllable object is an avatar representing the first player. And in one embodiment the input mechanism is a three-axis controller, and the display screen is in a head-mounted display (HMD).

In one embodiment, the display screen is in a head-mounted display (HMD), and the input mechanism is a physical input on the HMD. Also in one embodiment, a second avatar, controlled by a second player interacting with a second platform that enables the second player to traverse through the virtual environment by direct linear movement, rather than by teleporting, is displayed in the virtual environment. In one embodiment, after the object and the camera teleport to the second position, a second symmetrical region of the environment is displayed, centered on the controlled object at the second position, the second symmetrical region expanding in radius at the controlled rate. And in one embodiment, as the object arrives at each new position, and a new expanding region is displayed, the player is enabled to select a new position in the new expanding region, and to teleport the object and the camera to the new position.

In another aspect of the invention a virtual reality (VR) game method is provided, comprising executing software on a processor in a virtual reality (VR) game platform from a non-transitory medium, displaying on a display screen, under control of the software, an object at a first position in a virtual environment, the object controllable by a player interacting with the VR game platform to move in the virtual environment viewed by the player from a camera centered on the object, the further displaying a symmetrical region of the environment centered on the controlled object, the symmetrical region expanding in radius at a controlled rate, selecting, using the input mechanism, a second position within the expanding symmetrical region to move the object, and teleporting the object and the camera to the second position.

In one embodiment, the method further comprises managing the controlled rate of expansion of the symmetrical region as the rate that an avatar is moveable in the virtual environment by a second player interacting with a second platform that enables the second player to traverse through the virtual environment by direct linear movement, rather than by teleporting. Also in one embodiment, the method further selecting a second position by extending a pointer from the object in the virtual environment by use of the input mechanism, positioning an end of the pointer away from the object at a desired second position, and selecting the second position by a further input signal. Also in one embodiment, the controllable object is an avatar representing the first player. Also in one embodiment, the input mechanism is a three-axis controller, and the display screen is in a head-mounted display (HMD).

In one embodiment, the display screen is in a head-mounted display (HMD), and the input mechanism is a physical input on the HMD. Also in one embodiment, a second avatar, controlled by a second player interacting with a second platform that enables the second avatar to traverse through the virtual environment by direct linear movement, rather than by teleporting, is displayed in the virtual environment. In one embodiment, after the object and the camera teleport to the second position, a second symmetrical region of the environment is displayed, centered on the controlled object at the second position, the second symmetrical region expanding in radius at the controlled rate. And in one embodiment, as the object arrives at each new position, and a new expanding region is displayed, the player is enabled to select a new position in the new expanding region, and to teleport the object and the camera to the new position.

DETAILED DESCRIPTION OF THE INVENTION

The inventors provide a virtual reality control scheme and method for controlling teleporting of an Avatar in a three-dimensional virtual reality (VR) game or environment that is restricted by time and travel speed to create a more level playing field for other players not equipped with VR, that are using differing devices and controllers to operate their own Avatars in the same game or environment. The present invention is described in enabling detail using the following examples, which may describe more than one relevant embodiment falling within the scope of the present invention.

Figure 1:
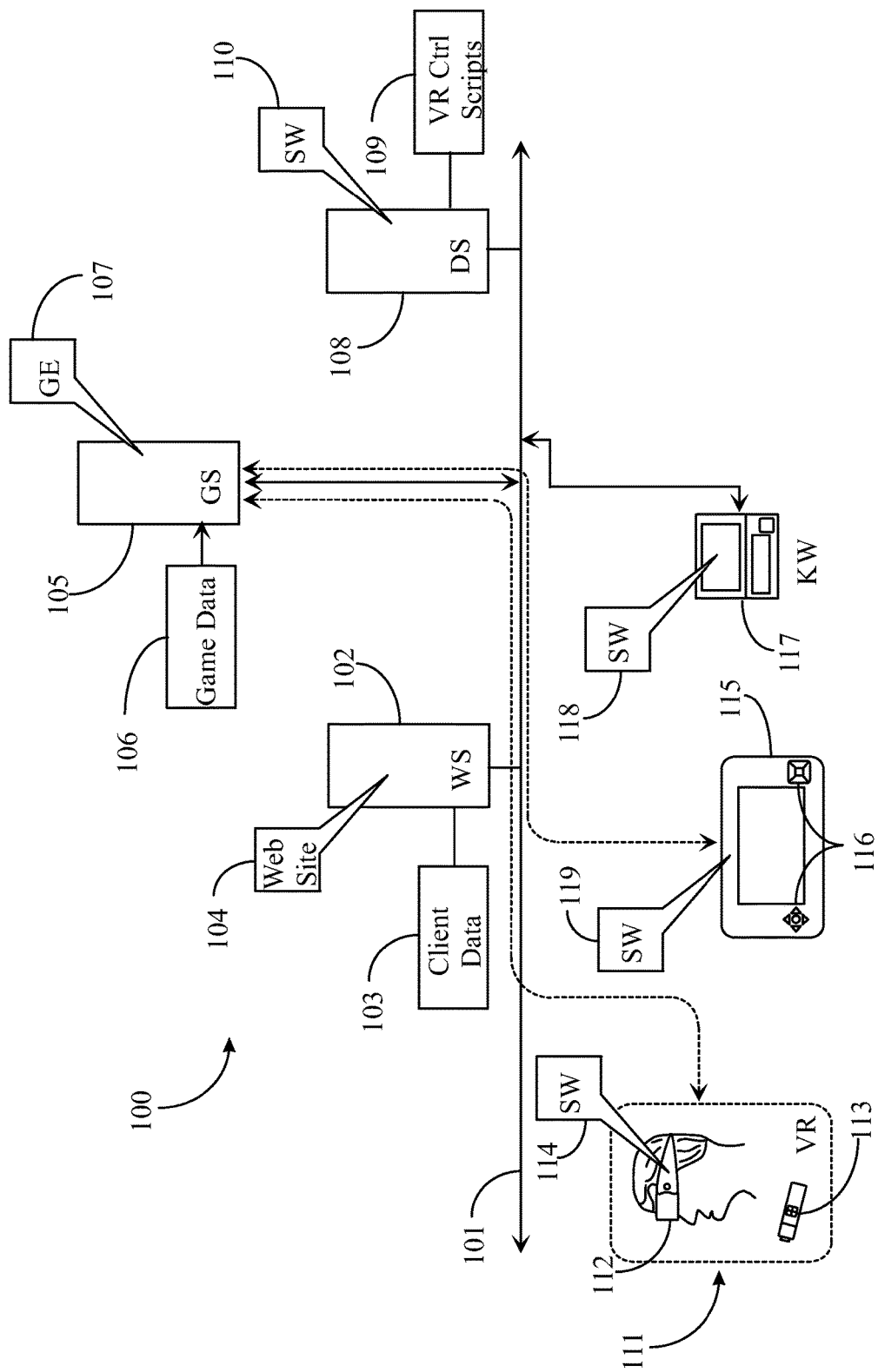
FIG. 1 is an architectural overview of a communications network over which virtual reality sessions may be practiced according to an embodiment of the present invention.

FIG. 1 is an architectural overview of a communications network 100 over which virtual reality sessions may be practiced according to an embodiment of the present invention. Communication network 100 includes the Internet network represented herein by a network backbone 101. Internet backbone 101 includes all of the lines, equipment and access points that make up the Internet as a whole including all connected sub-networks and carrier networks both wired and wireless. Carrier networks and sub-networks are not specifically illustrated in this embodiment but may be assumed present such as would be in place for users to access the Internet.

Internet 101 supports a Web server 102 hosting a Website (WS) 104. Website 104 may be an access point for clients of an Internet gaming site players. Web server 102 has connection to a data repository 103 containing client data including profile, membership, billing, and other related data for players. In one embodiment players that are site members of a gaming site may log into WS 104 and select games or environments from a searchable list that provides links to the servers hosting such games. One such server is a game server 105 hosting a game engine (GE) 107. Game server 105 may be a cloud server that the gaming enterprise leases or otherwise maintains as an available server for playing games and navigating virtual environments. Game server 105 has connection to a data repository 103 that may contain game data and instruction for service.

It may be noted herein that a game provider may host games built by game developers, wherein the provider does not write the game code or modify any code that the developers have written relative to control schemes or platform/device support. However, it is possible that a game provider may seek to add players, including VR players, to their existing games in a fashion that does not create unequal quality of play for players and that the VR players have an optimum experience in an Avatar or character-based game or environment.

Internet 101 supports a design server (DS) 108 running software (SW) 110. SW 110 enables a game provider to make control schemes available for VR players that may join a game that was not designed specifically for VR, but that supports VR in a way that is fair for VR players and those not using VR. In this example, a developer is depicted as using a computing device 117 having connection to Internet backbone 101 via an Internet access line or network. Device 117 has software (SW) 118 executable thereon. SW 118 enables the developer to design and create alternative controller schemes for VR players that may play an Avatar-based game. Design server 108 has connection to a data repository 109 containing controller scripts designed by such a developer operating from device 117 using SW 118. VR control scripts may be served to client end devices to be prioritized over default schemes.

A VR-equipped player 111 is depicted in this example, and has access to Internet 101 via a line, sub-network or carrier network, and appropriate Internet service provider (ISP). VR player 111 may have a 3-axis controller 113 and a head-mounted display (HMD) 112, which together provide the VR experience to the user. The 3-axis remote controller may be an existing implement in VR such as a Daydream™ controller, a Vive™ controller, Oculus™ touch controller, etc. HMD 112 may be any HMD supporting VR such as Google Cardboard™, Oculus™ HMD, etc.

HMD 112 may execute a gaming application or software (SW) 114 for rendering a VR presentation accordingly. In one implementation, SW 114 provides a laser pointer function that is part of a control script and avatar movement control method for directing teleportation of the avatar in a game, by projecting a parabolic laser from the controller, to be visualized in display such that the end of the pointer intersects with a selected destination in game for the avatar. In this implementation, there may be one or more conditions imposed on teleporting for a VR player in a same game with potential players who are not VR equipped, whereby they do not teleport but walk, run, or fly etc. from an avatar perspective.

VR player 111 may use pointer described above to emit a parabolic laser to mark a destination for teleport that may be held to a certain distance from the Avatar, based on a time factor relative to how long a walking or running avatar of a client not using teleport could travel (walking running or flying) over the same distance. Player 111 may push a button on HMD 112, or on controller 113, to initiate avatar teleport to the destination marked by the laser, with at least one physical limitation that prevents the avatar from teleport travel at a rate faster or more advantageous than a competing avatar that must walk, run or fly. It is noted herein hat the camera perspective of the VR player is that of the avatar, so the camera is mapped 100 percent to the VR player's HMD. In this implementation, a function for emulating a visible and expanding ripple or bubble governed by time, and a common travel speed (VR player, other player), may be initiated and visualized in VR by the VR player.

Such a visual ripple described in more detail below may be annular and may expand out equally and at a constant speed from the Avatar's teleported position at the instant the Avatar arrives. The VR player may visualize the ripple in a manner that does not obstruct objects in the VR environment. This effect may be achieved using translucent features that may be seen, but that may not obstruct the vision of the client for objects in the environment.

A second player device 115 is depicted having connection to Internet 101 through a wireless carrier network (not depicted). Device 115 is a gaming station running a gaming software (SW) 119. Device 115 has standard controller interfaces 116 to control avatar movement amongst other gaming functions. In this embodiment, player device 115 and player device 112 are in the same gaming session with server 105 and game engine 107, as depicted herein by broken session lines connecting each device to GS 105 and GE 107. The player' devices have different controllers for interacting with the game. In this embodiment, a game developer does not have to build or otherwise add any VR control scripts to game data 106 for game engine 107 for any games served. VR control scripts may be created in LUA, which is a very light-weight, object-oriented program language. Other languages may also be used without departing from the spirit and scope of the present invention.

In general use of the present invention, a developer may build a 3D game for general play for players using disparate platforms. The hosting entity may create control schemes for VR support that may replace traditional control schemes that may be VR defaults for a character or avatar to move. During a session, the hosting entity may detect a VR platform joining a game that supports VR alongside those not equipped with VR. The default scheme normally used by the VR player may be replaced in game with the overriding avatar teleport control script that uses the parabola or straight laser to select a position for the VR avatar to teleport to in game. This might be accomplished in a few different ways, for example, by making the control schema available to the VR client just before joining the game as a download ahead of the gaming stream. In one embodiment, the overriding control schema may be preselected by the VR client before playing.

In another embodiment, the overriding control scheme may be inserted as lightweight LUA scripts by proxy into the game stream, and based on detection of platform and peripheral input device be prioritized over other schemes for other players. In one implementation, there may be more than one avatar control schema for differing VR platforms without departing from the spirit and scope of the invention, wherein the device selects the appropriate schema based on the nature of the VR hardware used. For example, the laser parabola may emanate from the gaze point of a VR HMD like HMD 112 in the absence of a remote 3-axis controller, for example. In this way, a VR player and a player not equipped with VR may play a same avatar-based game or environment or application on a more equal and competitive playing field. It is noted that in VR the camera associated with the avatar is mapped 100% to the clients head relative to three-dimensional space.

Figure 2:
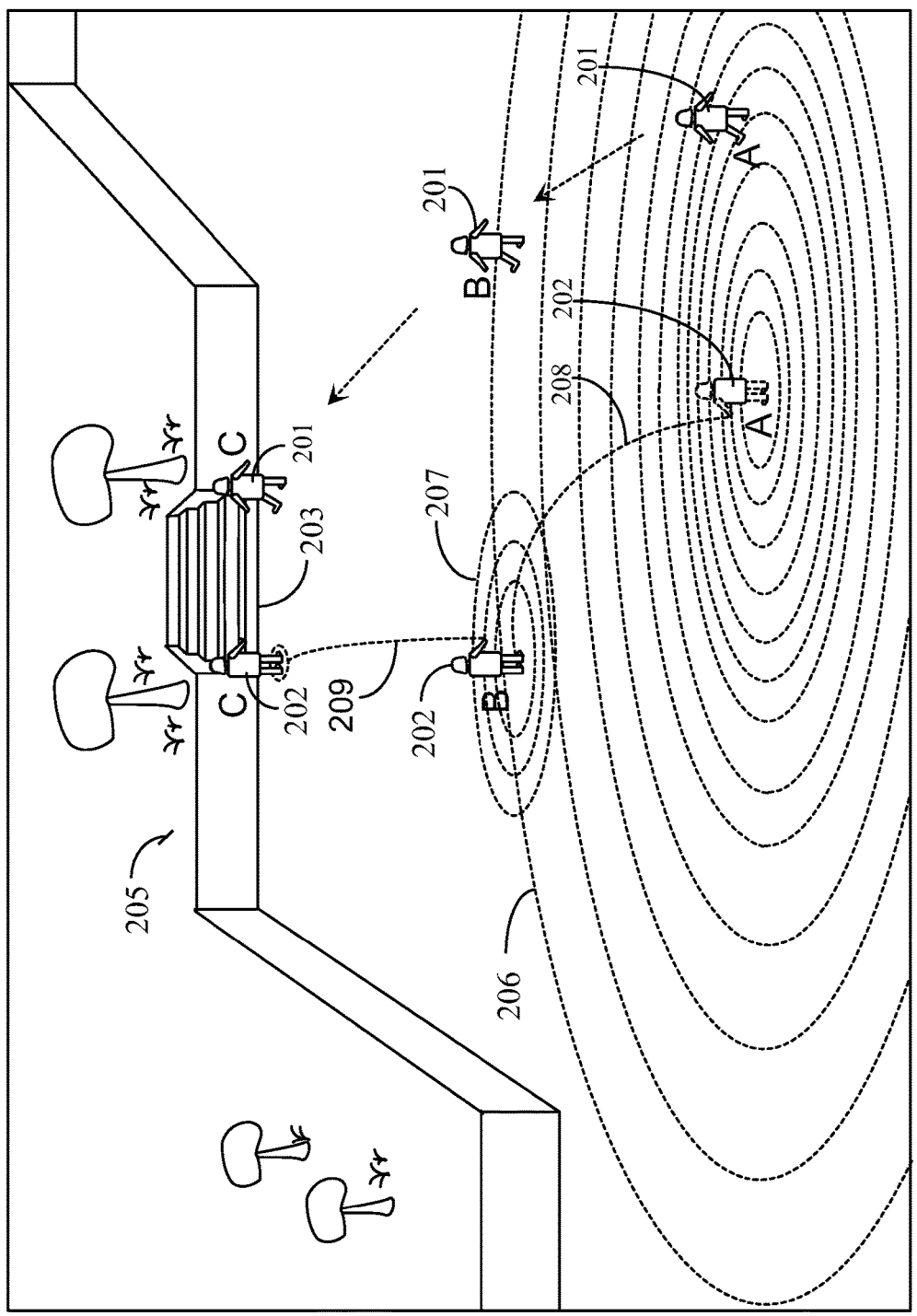
FIG. 2 is a screen shot view of a generated game or world landscape supporting VR player timed teleporting of an avatar according to an embodiment of the present invention.

FIG. 2 is an example of a display of a game or virtual-world landscape supporting restricted teleporting of a VR player's avatar according to an embodiment of the present invention, as well as movement of an avatar controlled by a player not VR-equipped. In this example the VR-equipped player uses a HMD for visualizing the environment, and a 3-axis controller to move an avatar 202. The display is of a courtyard or similar area with a raised level 205 accessible via a stairway 203. In this example, a player that is not using VR equipment is depicted as controlling an avatar 201 in the same game at the same time as avatar 202 is controlled by the VR player.

VR-controlled avatar 202 and non-VR-controlled avatar 201 are, in this example, in a process of movement through the landscape, as is depicted logically herein with representations of the player's avatars depicting a first position in the game, and future moved positions, which are marked consecutively in this example as A, B, C. Therefore, element numbers 202 for the VR player's avatar shall apply to all representations of that avatar. Likewise, element number 201 applies to all representations of the non-VR player's avatar in this example.

Note that each succeeding position of avatar 202 is marked as A, B, then C, as described above. The same is true for avatar 201. The non-VR player controlling avatar 201 may control avatar 201 by using a joy stick controller or a similar non-VR controller to initiate avatar walking or running or jumping, as is known in the art. It may be assumed herein that avatar 201 is making its way, controlled by the non-VR-equipped player, (dotted directional arrows), from position A, through position B, to stairway 203, position C. Within a same or similar time frame, VR player's avatar 202 is repeatedly teleporting toward stairway 203, from position A, through B, to C. The VR player's avatar 202 may be teleported along while the non-VR player's avatar may not be teleported and must walk or run to stairway 203.

It is emphasized that the movement of the avatars in this example is entirely exemplary, and the non-VR player may be moving avatar 201 in another direction or away from stairway 203, and the VR-equipped player may be moving avatar 202 anywhere in the landscape, subject to restrictions detailed herein.

At any position of avatar 202, consider position A for example, a ripple effect 206 is generated, visible to the VR-equipped player, and this begins as soon as the avatar enters the game or completes a teleporting move, and expands outward radially from the position of avatar 202. In this implementation, the rate of expansion of ripple effect 206 is equal to a maximum walk or run speed of avatar 201 as controlled by a non-VR player.

The ripple effect is an effect visible to the VR-equipped player, and the VR-equipped player may select any point within the expanding area of the ripple, and may teleport immediately to the selected point. The visual nature may be thin rings as shown in FIG. 2, or just one expanding ring, or may, for example be an expanding halo, or ring of brightness. The essential quality is that the VR-equipped player is informed by this expanding ring of all the real estate open to teleportation of the controlled avatar.

VR avatar 202, while stationary at the point of game entry A, may select a teleport destination by a laser pointer 208, via the VR player's hand-held 3-axis controller in this example, as described above, that may intersect a spot near the current edge of the expanding ripple effect 206 as depicted, and may immediately teleport there. The camera is specifically mapped to the VR player's avatar's head. In one embodiment, the laser pointer may be a straight line. Further, the pointer may be controlled in some cases by an input device on the HMD.

Again, it is emphasized, that although in this example the VR-equipped player has chosen to teleport avatar 202 to point B, at the edge of expanding ring 202, any other point within the region of the expanding ring may have been selected.

The expanding ring prevents the player controlling avatar 202 from selecting a destination that is beyond the current outer peripheral edge of expanding ripple effect 206, which indicates the movement ability of avatar 201, controlled by a non-VR-equipped player. Thusly, the two players, using very different platforms, are rendered rather more equal in movement ability than would otherwise be the case. This restriction may be applied relative to a speed that avatar 201 must walk or run in the game. In one implementation, avatar 201 may move at a speed which may be the same speed that ripple effect 206 expands. In another implementation, the expansion rate of ripple effect 206 may be variable and controllable by the VR player but still entirely based on the rate or speed of travel that the non-VR player's avatar can travel. For example, if the non-VR avatar changes speed, the VR player may adjust the speed of expansion of ripple effect 206 accordingly.

After teleporting to position B, a second ripple effect 207 immediately begins at that point, and expands outward in the same fashion as the first ripple effect 206. Ripple effect 206 disappears, in this example, once a second effect is initiated. Ripple effect 207 will take some time to expand all of the way to the face of staircase 203, the presumed destination for both of the avatars in this example. Avatar 202 controlled by the VR player, may launch another laser toward stair case 203, however it cannot mark a destination unless ripple effect 207 has expanded to that point.

It is noted herein that the ripple effect (206, 207) is the same effect repeated every time the VR player teleports the avatar to a new destination. It may also be noted herein that the ripple effect may be a two dimensional or flat effect such as spreading across a floor or the ground, it might also transform or be transformed into an expanding spherical ripple effect in three dimension (3D). To illustrate, a VR avatar may be teleporting through an atmosphere or in space whereas another non-VR player avatar is physically flying or jumping through the same space. The VR player may use the laser to mark the edge of the expanding spherical ripple effect to teleport to that destination in space. In one implementation, a ripple effect may be designed to climb up vertical walls up to ledges or prepuces in a game architecture in order to enable teleportation to such places as long as the ripple has made it to that point in the expansion.

Figure 3:
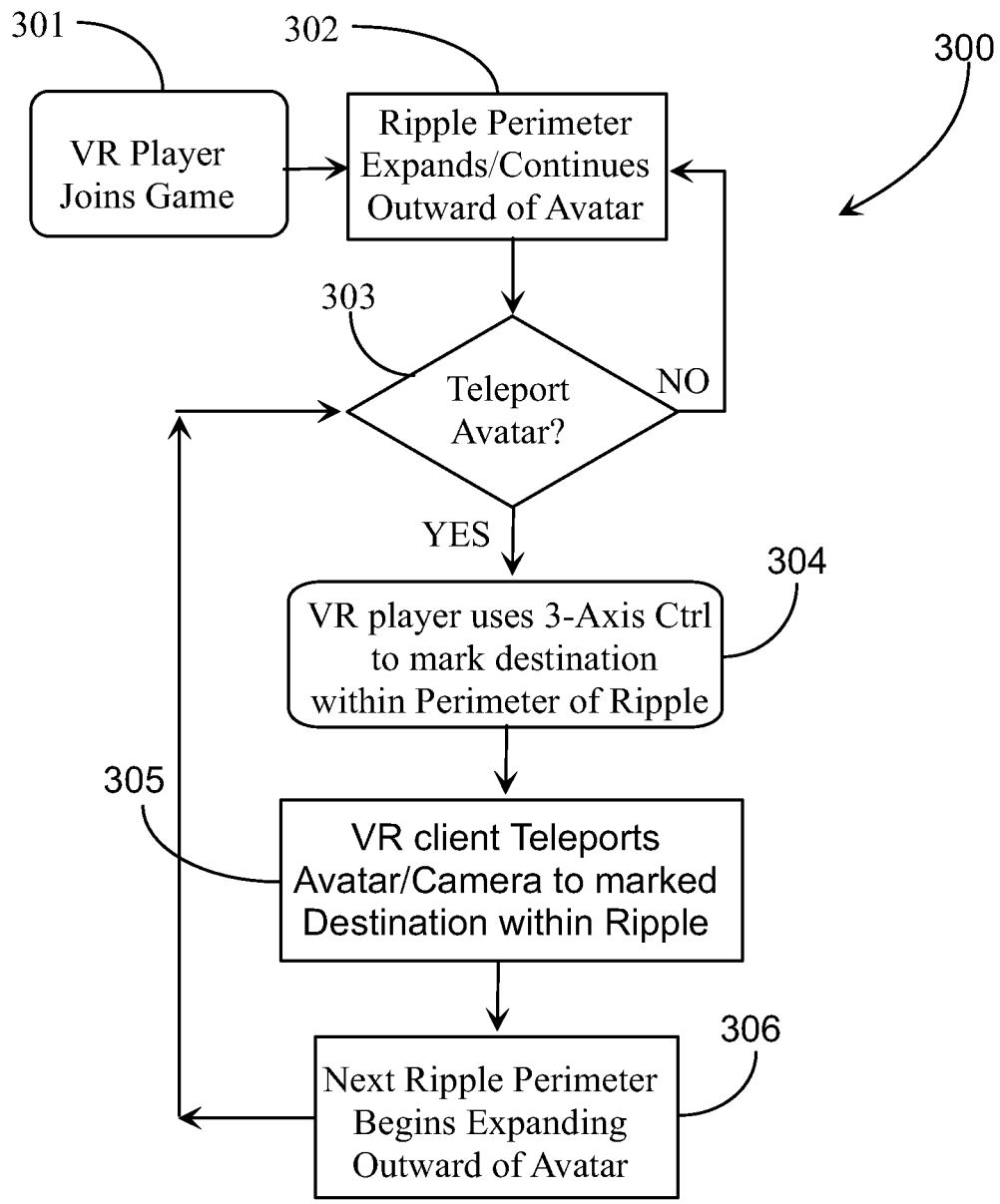
FIG. 3 is a process flow chart depicting steps for timed teleporting of an avatar in a VR environment that may also be navigated by players not using VR components or control schemes.

FIG. 3 is a process flow chart 300 depicting steps for timed teleporting of an avatar in a VR environment that may also be navigated by players not using VR equipment or control schemes. At step 301 a VR equipped player may join (enter into) a game or environment. At step 302 a first ripple effect initiates about the player's avatar and begins expanding at a set speed radially outward of the avatar. The VR player may see the effect in the display of the HMD.

At any time during the expansion of the ripple effect initiated at step 302, the VR player may determine whether or not to teleport his avatar to a new position or destination. If at step 303 the VR player (client) determines not to teleport, the process may loop back to step 302 where the ripple effect continues to expand in the space. If at step 303 the VR player decides to teleport, then at step 304 the VR client may use a 3-axis controller analogous to controller 113 of FIG. 1 to mark a destination. In order to successfully mark a spot for teleportation, the spot marked must be within the outer boundary of the expanding ripple effect, or just behind the lead ripple for maximum efficiency. In one implementation, in step 304, where the user has a VR HMD but no 3-axis controller, the laser may be a straight laser. A button on the display may be assigned to mark the spot and initiate the travel such as for Google cardboard, which as an input button on one side.

Once a destination is marked, at step 305 the VR player may teleport the avatar to a marked destination within the ripple effect. It is noted that the camera is mapped to the HMD of the VR player and is the viewpoint of the avatar, so the camera is teleported together with the avatar. The VR client immediately sees the landscape from the perspective of the new teleported position. At step 306, a next ripple effect automatically initiates and begins expanding when the avatar lands at the new spot in the landscape. The process may then resolve back to step 303 waiting for the VR player to decide to teleport again. In this process, the rate at which the VR avatar may move through the game space is limited by the rate of expansion of the ripple effect, which is tied to the rate of travel allowed by non-VR avatars. There may be one rate or more than one rate depending on the travel speed capabilities of the avatars. A VR player may toggle the rate of expansion of the ripple if more than one speed is allowed for avatar travel.

Figure 4:
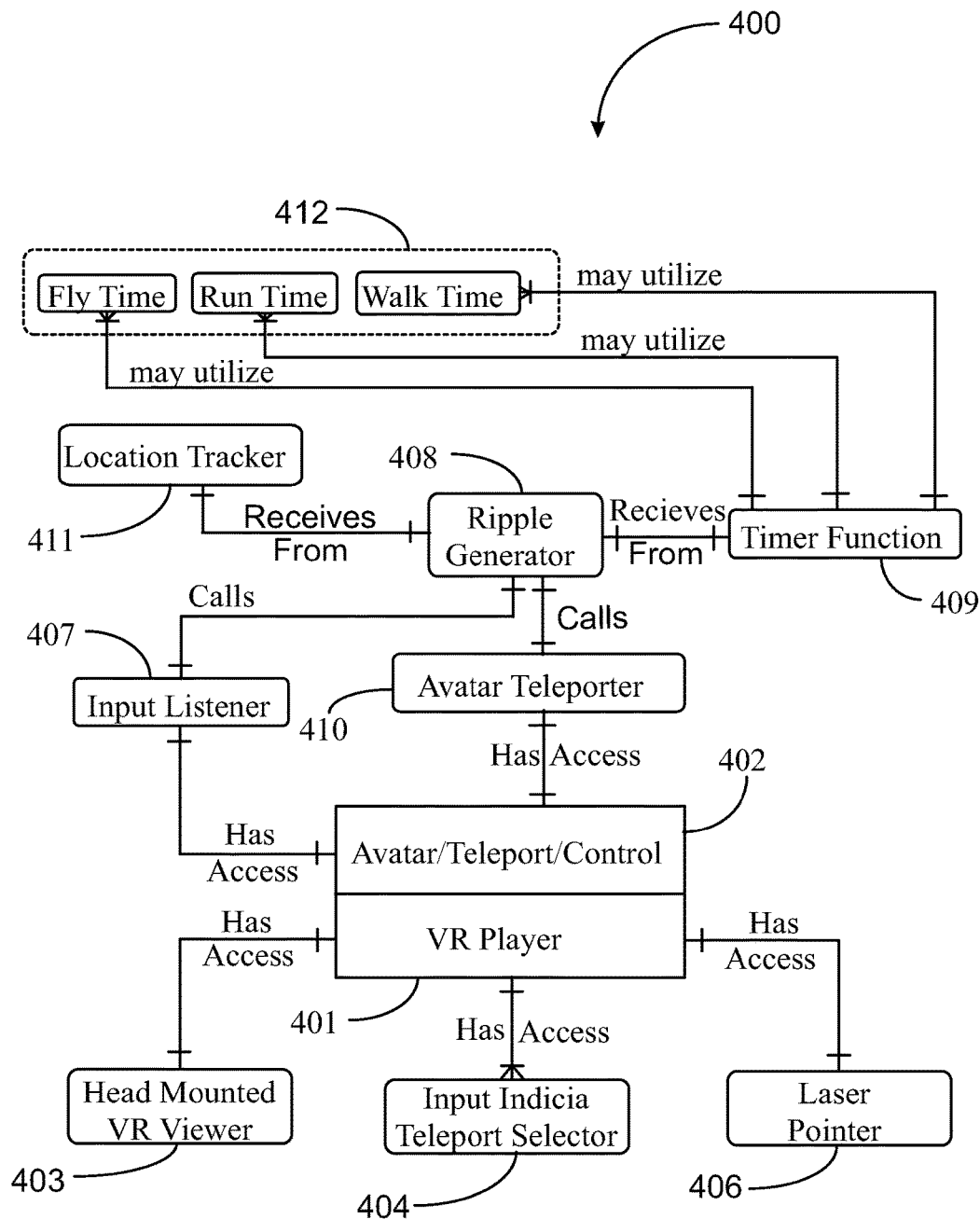
FIG. 4 is a UML diagram depicting a control scheme model for VR players in a game that also supports players not equipped with VR.

FIG. 4 is a UML diagram depicting a control scheme model 400 for VR players in a game that also supports players not equipped with VR. Diagram 400 depicts a control scheme 402 (ripple/teleport control) specifically for a VR player 401. VR player 401 has a head mounted VR viewer 403 such as an Oculus™ system or Google Cardboard™ VR player 401 has input indicia 404 such as a button or teleport selector to initiate movement of an avatar. Model attribute 404 may also be an attribute of VR viewer 403 or of laser pointer 406 (3-axis enabled) without departing from the spirit and scope of the present invention, such as on a Google Cardboard™ viewer or a hand-held 3-axis controller.

Avatar ripple control 402 has access in this example to an input detection or listener 407. Control 402 has access to an avatar teleporter function 410 for teleporting an avatar according to at least one constraint or limitation governed by the ripple effect. Input listener 407 may detect input from a VR client marking a destination for avatar teleportation and call a ripple generator 408 to configure and initiate an expanding ripple visible to the VR player. The ripple generator may receive information from a location tracker 411 responsible for tracking an avatar within the game space. The generator may initiate the ripple at the last location of the avatar.

Avatar teleporter function 410 may receive information from the ripple generator to initiate avatar teleportation. Timer function 409 may calculate how much time it may take for an avatar that does not have VR equipment to travel a path based on geographic distance (in game) and speed of avatar motion currently used by the player. Ripple function 408 may receive information from timer function 409 in conjunction with receiving a call from input listener 407 and may adjust the expansion rate of the ripple based on the input and allowed travel rates for non-VR avatars. Attribute data 412 includes a fly speed or speeds for an avatar, a run speed or speeds for an avatar, and a walk speed or speeds for an avatar. These speeds may be standard in game constants and the number of options may depend upon avatar capabilities and may also include swimming or other modes of locomotion such as driving. Further, each speed value may include more than one separate static value, like slow run time and fast run time, etc. For example, input listener 407 may detect a toggle action by a VR player physically moving from one speed to another speed of ripple expansion and report that to the ripple generator, whereby the ripple expansion rate may be accordingly adjusted in real time. In one implementation Timer function 409 may notify avatar teleporter 410 to commence teleportation of an avatar in place of the ripple generator without departing from the spirit and scope of the present invention.

The present invention enables VR players to play a VR supported Game on an equal playing field with other players in a manner that prevents the VR player from becoming uncomfortable using a HMD. It will be apparent to one with skill in the art that the system of the present invention may be practiced using all or a combination of components described in this specification. It will also be apparent to the skilled artisan that the embodiments described above are specific examples of a single broader invention that may have greater scope than any of the singular descriptions taught. There may be many alterations made in the descriptions without departing from the spirit and scope of the present invention.

It will be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented and in which the software may be provided within the scope of the invention. The invention is limited only by the breadth of the claims below.

The invention claimed is:

1. A virtual reality (VR) game platform, comprising:
an input mechanism;
software executing on a processor from a non-transitory medium; and
a display screen displaying, under control of the software, an object at a first position in a virtual environment, the object controllable by a player interacting with the VR game platform to move in the virtual environment viewed by the player from a camera centered on the object, the display screen further displaying a symmetrical region of the environment centered on the controlled object, the symmetrical region expanding in radius at a controlled rate;
wherein the player is enabled to select, using the input mechanism, a second position within the expanding symmetrical region to move the object, after which selection the object teleports to the second position, and the camera teleports to the second position as well.

2. The VR game platform of claim 1 wherein the controlled rate of expansion of the symmetrical region is managed as the rate that an avatar is moveable in the virtual environment by a second player interacting with a second platform that enables the second player to traverse through the virtual environment by direct linear movement, rather than by teleporting.

3. The VR game platform of claim 1 wherein the second position is selected by extending a pointer from the object in the virtual environment by use of the input mechanism, positioning an end of the pointer away from the object at a desired second position, and selecting the second position by a further input signal.

4. The VR game platform of game 1 wherein the controllable object is an avatar representing the first player.

5. The VR game platform of claim 1 wherein the input mechanism is a three-axis controller, and the display screen is in a head-mounted display (HMD).

6. The VR game platform of claim 5 wherein the display screen is in a head-mounted display (HMD), and the input mechanism is a physical input on the HMD.

7. The VR game platform of claim 4 wherein a second avatar, controlled by a second player interacting with a second platform that enables the second player to traverse through the virtual environment by direct linear movement, rather than by teleporting, is displayed in the virtual environment.

8. The VR game platform of claim 1 wherein after the object and the camera teleport to the second position, a second symmetrical region of the environment is displayed, centered on the controlled object at the second position, the second symmetrical region expanding in radius at the controlled rate.

9. The VR game platform of claim 8 wherein, as the object arrives at each new position, and a new expanding region is displayed, the player is enabled to select a new position in the new expanding region, and to teleport the object and the camera to the new position.

10. A virtual reality (VR) game method, comprising:
executing software on a processor in a virtual reality (VR) game platform from a non-transitory medium;
displaying on a display screen, under control of the software, an object at a first position in a virtual environment, the object controllable by a player interacting with the VR game platform to move in the virtual environment viewed by the player from a camera centered on the object, the further displaying a symmetrical region of the environment centered on the controlled object, the symmetrical region expanding in radius at a controlled rate;
selecting, using the input mechanism, a second position within the expanding symmetrical region to move the object; and
teleporting the object and the camera to the second position.

11. The VR game method of claim 10, comprising managing the controlled rate of expansion of the symmetrical region as the rate that an avatar is moveable in the virtual environment by a second player interacting with a second platform that enables the second player to traverse through the virtual environment by direct linear movement, rather than by teleporting.

12. The VR game method of claim 10 comprising selecting second position by extending a pointer from the object in the virtual environment by use of the input mechanism, positioning an end of the pointer away from the object at a desired second position, and selecting the second position by a further input signal.

13. The VR game method of game 1 wherein the controllable object is an avatar representing the first player.

14. The VR game method of claim 10 wherein the input mechanism is a three-axis controller, and the display screen is in a head-mounted display (HMD).

15. The VR game method of claim 14 wherein the display screen is in a head-mounted display (HMD), and the input mechanism is a physical input on the HMD.

16. The VR game method of claim 13 wherein a second avatar, controlled by a second player interacting with a second platform that enables the second avatar to traverse through the virtual environment by direct linear movement, rather than by teleporting, is displayed in the virtual environment.

17. The VR game method of claim 10 wherein, after the object and the camera teleport to the second position, a second symmetrical region of the environment is displayed, centered on the controlled object at the second position, the second symmetrical region expanding in radius at the controlled rate.

18. The VR game platform of claim 17 wherein, as the object arrives at each new position, and a new expanding region is displayed, the player is enabled to select a new position in the new expanding region, and to teleport the object and the camera to the new position.

* * * * *